(12) United States Patent
Handley (10) Patent No.: US 8,832,001 B2
(45) Date of Patent: Sep. 9, 2014

(54) MODELING OF INCIDENTS AFFECTING QUALITY OF SERVICE OF A TRANSPORTATION SYSTEM

(75) Inventor: John C. Handley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 245 days.

(21) Appl. No.: 13/563,053

(22) Filed: Jul. 31, 2012

(65) Prior Publication Data

US 2014/0040166 A1 Feb. 6, 2014

(51) Int. Cl.
G06F 17/00 (2006.01)
G06F 17/20 (2006.01)

(52) U.S. Cl.
USPC .......................................................... 706/11

(58) Field of Classification Search
USPC .......................................................... 706/11
See application file for complete search history.

(56) References Cited

U.S. PATENT DOCUMENTS

| | | | |
|---|---|---|---|
| 6,486,801 B1 | 11/2002 | Jones | |
| 6,492,912 B1 | 12/2002 | Jones | |
| 6,618,668 B1 | 9/2003 | Laird | |
| 6,683,542 B1 | 1/2004 | Jones | |
| 6,952,645 B1 | 10/2005 | Jones | |
| 7,030,781 B2 | 4/2006 | Jones | |
| 7,546,206 B1* | 6/2009 | Miller et al. | 701/415 |
| 7,720,630 B1* | 5/2010 | Miller et al. | 702/150 |
| 8,352,298 B2 | 1/2013 | Handley et al. | |
| 8,573,366 B2* | 11/2013 | Elomaa et al. | 187/387 |
| 2010/0088146 A1 | 4/2010 | Zhong et al. | |
| 2012/0090922 A1* | 4/2012 | Elomaa et al. | 187/247 |
| 2013/0024249 A1 | 1/2013 | Zohar et al. | |
| 2013/0176401 A1* | 7/2013 | Monari et al. | 348/47 |
| 2014/0039986 A1 | 2/2014 | Handley | |

OTHER PUBLICATIONS

Washington et al., "Count Data Models", Statistical and Econometric Methods for Transportation Data Analysis, Second Edition, Chapter 11, pp. 283-301, published by CRC Press, 2011 by Taylor & Francis Group, LLC.
Atkins, et al., "Re-thinking how family researchers model infrequent outcomes: A tutorial on count regression and zero-inflated models", To be published as (copyright American Psychological Association), Journal of Family Psychology, 33 pages.
A Guidebook for Developing a Transit Performance-Measurement System, Transit Cooperative Research Program Report 88, 2003, Chapter 4, pp. 110-118.
Hubert et al., ROBPCA: A New Approach to Robust Principal Component Analysis, American Statistical Association and the American Society for Quality, Technometrics, Feb. 2005, vol. 47, No. 1, pp. 64-79.
H. Chen, Principal Component Analysis with Missing Data and Outliers, Electrical and Computer Engineering Department, Rutgers University.

* cited by examiner

*Primary Examiner* — Michael B Holmes
(74) *Attorney, Agent, or Firm* — Fox Rothschild LLP (57) ABSTRACT

A method and a device for predicting a future occurrence of a transportation system incident are disclosed. The method includes receiving transportation incident data comprising information collected during and related to operation of at least one transportation vehicle, the information comprising at least a time stamp, constructing at least one count regression model based upon the transportation incident data, producing a results set based upon the at least one count regression model, predicting at least one future occurrence of an incident based upon the results set, and presenting the at least one predicted future occurrence. The device includes at least a processing device and computer readable medium containing a set of instructions configured to cause the device to perform the method.

20 Claims, 12 Drawing Sheets

| | 2010-08 | 2010-09 | 2010-10 | 2010-10 | 2010-11 | 2010-12 | 2011-01 | 2011-02 | 2011-03 | 2011-04 | 2011-05 | 2011-06 | 2011-07 | 2011-08 | 2011-09 |
|---|---|---|---|---|---|---|---|---|---|---|---|---|---|---|---|
| 0 hr | 1 | 2 | 0 | 0 | 5 | 2 | 4 | 5 | 6 | 0 | 1 | 2 | 0 | 6 | 40 |
| 1 hr | 0 | 1 | 0 | 0 | 1 | 5 | 11 | 7 | 6 | 4 | 5 | 4 | 23 | 19 | 3 |
| 5 hr | 0 | 2 | 0 | 0 | 3 | 12 | 12 | 16 | 10 | 2 | 5 | 1 | 4 | 4 | 6 |
| 6 hr | 1 | 13 | 0 | 0 | 27 | 58 | 37 | 30 | 31 | 24 | 31 | 23 | 33 | 31 | 68 |
| 7 hr | 1 | 38 | 5 | 5 | 81 | 153 | 93 | 99 | 98 | 76 | 87 | 52 | 85 | 42 | 206 |
| 8 hr | 4 | 83 | 0 | 0 | 118 | 277 | 154 | 173 | 141 | 92 | 111 | 80 | 115 | 74 | 232 |
| 9 hr | 1 | 65 | 1 | 1 | 109 | 154 | 91 | 126 | 89 | 80 | 85 | 112 | 103 | 118 | 125 |
| 10 hr | 7 | 54 | 4 | 4 | 73 | 140 | 110 | 119 | 98 | 130 | 93 | 131 | 91 | 87 | 130 |
| 11 hr | 6 | 43 | 1 | 1 | 68 | 99 | 83 | 91 | 65 | 96 | 80 | 82 | 71 | 79 | 80 |
| 12 hr | 10 | 47 | 2 | 2 | 108 | 107 | 91 | 128 | 98 | 119 | 146 | 128 | 174 | 199 | 140 |
| 13 hr | 12 | 62 | 2 | 2 | 155 | 144 | 112 | 97 | 118 | 149 | 182 | 187 | 137 | 192 | 142 |
| 14 hr | 4 | 52 | 2 | 2 | 48 | 87 | 83 | 97 | 113 | 136 | 121 | 120 | 134 | 177 | 175 |
| 15 hr | 5 | 52 | 5 | 5 | 118 | 147 | 135 | 130 | 143 | 154 | 196 | 187 | 123 | 140 | 182 |
| 16 hr | 8 | 41 | 0 | 0 | 149 | 190 | 144 | 148 | 180 | 146 | 226 | 186 | 142 | 132 | 202 |
| 17 hr | 10 | 35 | 1 | 1 | 128 | 177 | 148 | 148 | 186 | 133 | 117 | 135 | 119 | 131 | 152 |
| 18 hr | 4 | 28 | 1 | 1 | 83 | 144 | 72 | 65 | 87 | 92 | 104 | 136 | 41 | 105 | 162 |
| 19 hr | 0 | 23 | 6 | 6 | 46 | 101 | 62 | 75 | 45 | 50 | 54 | 59 | 78 | 40 | 107 |
| 20 hr | 14 | 39 | 4 | 4 | 39 | 88 | 74 | 81 | 59 | 60 | 65 | 69 | 97 | 84 | 125 |
| 21 hr | 18 | 58 | 6 | 6 | 64 | 155 | 142 | 117 | 83 | 117 | 110 | 134 | 92 | 78 | 99 |
| 22 hr | 6 | 44 | 0 | 0 | 15 | 79 | 57 | 65 | 61 | 67 | 56 | 62 | 62 | 51 | 86 |
| 23 hr | 6 | 34 | 0 | 0 | 26 | 83 | 46 | 40 | 31 | 43 | 44 | 65 | 62 | 56 | 86 |

FIG. 9

MODELING OF INCIDENTS AFFECTING QUALITY OF SERVICE OF A TRANSPORTATION SYSTEM

BACKGROUND

The present disclosure relates to modeling of incident occurrences related to a service provider, such as a transportation system. More specifically, the present disclosure relates to regression modeling of incident occurrences that impact quality of service provided by the service provider.

Many service providers monitor and analyze analytics related to the services they provide. For example, computer aided dispatch/automated vehicle location (CAD/AVL) is a system in which public transportation vehicle positions are determined through a global positioning system (GPS) and transmitted to a central server located at a transit agency's operations center and stored in a database for later use. The CAD/AVL system also typically includes two-way radio communication by which a transit system operator can communicate with vehicle drivers. The CAD/AVL system may further log and transmit incident information including an event identifier (ID) and a time stamp related to various events that occur during operation of the vehicle. For example, for a public bus system, logged incidents can include door opening and closing, driver logging on or off, wheel chair lift usage, bike rack usage, current bus condition, and other similar events. Some incidents are automatically logged by the system as they are received from vehicle on-board diagnostic systems or other data collection devices, while others are entered into the system manually by the operator of the vehicle.

For a typical public transportation company, service reliability is defined as variability of service attributes. Problems with reliability are ascribed to inherent variability in the system, especially demand for transit, operator performance, traffic, weather, road construction, crashes, and other similar unavoidable or unforeseen events. As transportation providers cannot control all aspects of operation owing to these random and unpredictable disturbances, they must adjust to the disturbances to maximize reliability. Several components that determine reliable service are schedule adherence, maintenance of uniform headways (e.g., the time between vehicles arriving in a transportation system), minimal variance of maximum passenger loads, and overall trip times. However, most public transportation companies put a greater importance on schedule adherence.

By using a CAD/AVL system, transit operators can easily obtain current and historical operation information related to a vehicle or a fleet of vehicles. However, the information shows an overall trend of the data, not individual data related to specific incidents that may occur during the operation of a vehicle. For example, the historical information may show how well a vehicle adhered to a set schedule over a period of time (e.g., three months), but the information does not provide an easy way to determine cause of unreliability and the relationship between reliability and passenger travel behavior, nor does the information provide an understanding of the effect of unreliability on operational costs.

SUMMARY

In one general respect, the embodiments disclose a method of predicting a future occurrence of a transportation system incident. The method includes receiving, at a processing device, transportation incident data comprising information collected during and related to operation of at least one transportation vehicle, the information comprising at least a time stamp; constructing, by the processing device, at least one count regression model based upon the transportation incident data; producing, by the processing device, a results set based upon the at least one count regression model; predicting, by the processing device, at least one future occurrence of an incident based upon the results set; and presenting, by the processing device, the at least one predicted future occurrence.

In another general respect, the embodiments disclose a device for predicting a future occurrence of a transportation system incident. The device includes a processor and a computer readable medium operably connected to the processor, the computer readable medium containing a set of instructions. The set of instructions are configured to instruct the processor to receive transportation incident data comprising information collected during and related to operation of at least one transportation vehicle, the information comprising at least a time stamp, construct at least one count regression model based upon the transportation incident data, produce a results set based upon the at least one count regression model, predict at least one future occurrence of an incident based upon the results set, and present the at least one predicted future occurrence.

In another general respect, the embodiments disclose an alternative method of predicting a future occurrence of a transportation system incident for a transportation vehicle. The method includes receiving, at a processing device, transportation incident data comprising information collected during and related to operation of the transportation vehicle, the information comprising at least a time stamp; constructing, by the processing device, at least one contingency table based upon the transportation incident data; constructing, by the processing device, at least one count regression model based upon the at least one contingency table; producing, by the processing device, a results set based upon the at least one count regression model; predicting, by the processing device, at least one future occurrence of an incident likely to effect the transportation vehicle based upon the results set; presenting, by the processing device, the at least one predicted future occurrence likely to effect the transportation vehicle; and altering at least a portion of the transportation system based upon the at least one predicted future occurrence to compensate for the at least one predicted future occurrence likely to effect the transportation vehicle.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

A "contingency table" refers to a table typically organized using a matrix format for displaying frequency distribution of two or more variables. A contingency table may be used to illustrate relationships between two or more categorical variables, whereby a degree of association between the two or more variables may be determined using statistical analysis.

A "count regression model" or "regression model" is a model based upon an analysis of several variables using regression analysis techniques. A count regression model typically highlights a relationship between a dependent variable and one or more independent variables by showing how the value of the dependent variable changes when any one of the independent variables is varied. Count regression models are commonly used for predicting and forecasting outcomes based upon historic information. Count regression models are also commonly used to analyze which among a group of independent variables is most closely related to a dependent variable, and how that relationship is impacted by variation. A count regression model may be used to visually represent information contained within a contingency table, further illustrating the relationships between the variables represented by the contingency table.

The present disclosure is directed to a method and system for analyzing data from a service provider, such as a public transportation system service provider. For example, public transportation companies monitor quality of service analytics related to how a transit system is performing. Generally, the analytics reflect average performance of the transit system, variation of the performance over time, and a general distribution of performance over time. For a public transportation system, low quality of service can result in decreased ridership, higher costs and imbalanced passenger loads. As performance variability increases, waiting times also increase, thereby directly impacting customer satisfaction. From a passenger perspective, reliable service requires origination and destination points that are easily accessible, predictable arrival times at a transit stop, short running times on a transit vehicle, and low variability of running time. Poor quality of service can result in passengers potentially choosing another transportation option, thereby hurting the public transportation company potential income.

An incident is a random but significant event that is expected to occur due to the nature of the service, but which has the effect of slowing or delaying the overall delivery of the service. In the context of a public transportation system such as a bus or train service, an incident may include, for example, the loading and/or unloading of a bike onto a bike rack attached on the front of the bus, the loading and/or unloading of a wheelchair using a motorized lift, or the arrival of a vehicle at its expected stop later than the scheduled time or time range (e.g., a late arrival incident).

In an embodiment, a transportation system may use a computer aided dispatch/automated vehicle location (CAD/AVL) system to monitor, collect and store data that is used to determine a historical account of incidents (e.g., later arrivals at a transit stop, wheelchair loading/unloading, bike rack loading/unloading) that may negatively impact schedule adherence and, thus, reliability of the system. The incident data may also be used to alter the current performance of the transportation system, by providing additional vehicles to provide service, reducing the number of vehicles currently providing service, notifying vehicle drivers of schedule changes, notifying customers of schedule changes, and other related system alterations.

The present disclosure further provides creating of a contingency table of incidents counts sorted by a covariate (e.g., hour of day, day of week, month of year) and fitting one or more count regression models to the contingency table. The model fit may be assessed and one or more regression coefficients of the regression model may be interpreted to: 1) indicate one or more alterations or improvements that may be made to the transportation system to reduce the impact of incidence occurrence; 2) assess the impact of a policy decision such as installation of bike racks on buses, schedule changes, fare changes, reducing the availability of para-transit services that forces more wheel chair lift usage on fixed route transit, shifting students from school buses to public transportation and other similar policy decisions; 3) assess the effect of exogenous variables on the system including weather, demographic shifts, economic developments (e.g., new employers, massive layoffs, new shopping malls or other commercial developments), natural and man-made disasters, and other similar exogenous variables; and 4) predict future system impact of incidents, such as predicting the expected number of late bus arrivals on a Tuesday morning in January.

Figure 1:
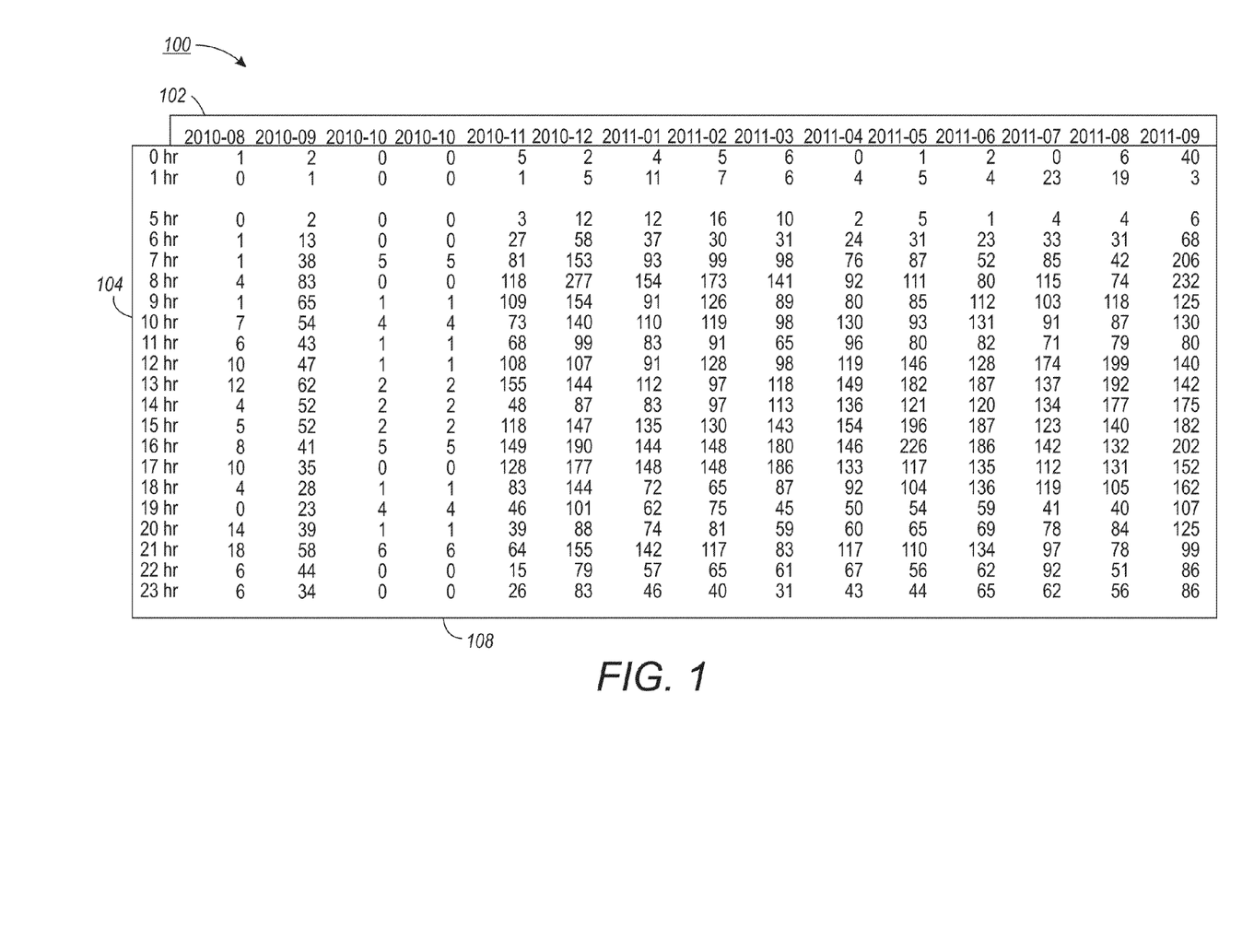
FIG. 1 depicts a contingency table according to an embodiment.

FIG. 1 illustrates an example of a contingency table 100 showing how incidents may be related over a first period of time (x-axis) and a second, shorter period of time (y-axis) within each of the longer periods. In particular, the table 100 of FIG. 1 shows a number of incidents that occurred at a specific point, and it illustrates how the incidents varied as a function of hour of day and month of year. As such, an x-axis 102 of the contingency table 100 may denote month of the year, while the y-axis 104 may denote the time of day the incidents occur. The body 108 of the contingency table 100 may include the number of incidents organized according to time of day and month of the year the incidents occurred.

For example, the contingency table 100 may illustrate the number of times that a public transportation vehicle was late arriving to a specific stop over a year. The information may be collected by and received from the CAD/AVL system associated with the transportation vehicle and stored in a database from which the contingency table is developed. In this example, the bus stop may not be used at 2:00 AM, 3:00 AM or 4:00 AM, and those corresponding rows are blank. It should be noted that various aspects of contingency table 100 are shown by way of example only. For example, additional time slices such as every 15 minutes may be used. Similarly, months may be replaced with weeks or individual days to provide a more detailed look at when the individual incidents occur.

Figure 2A:
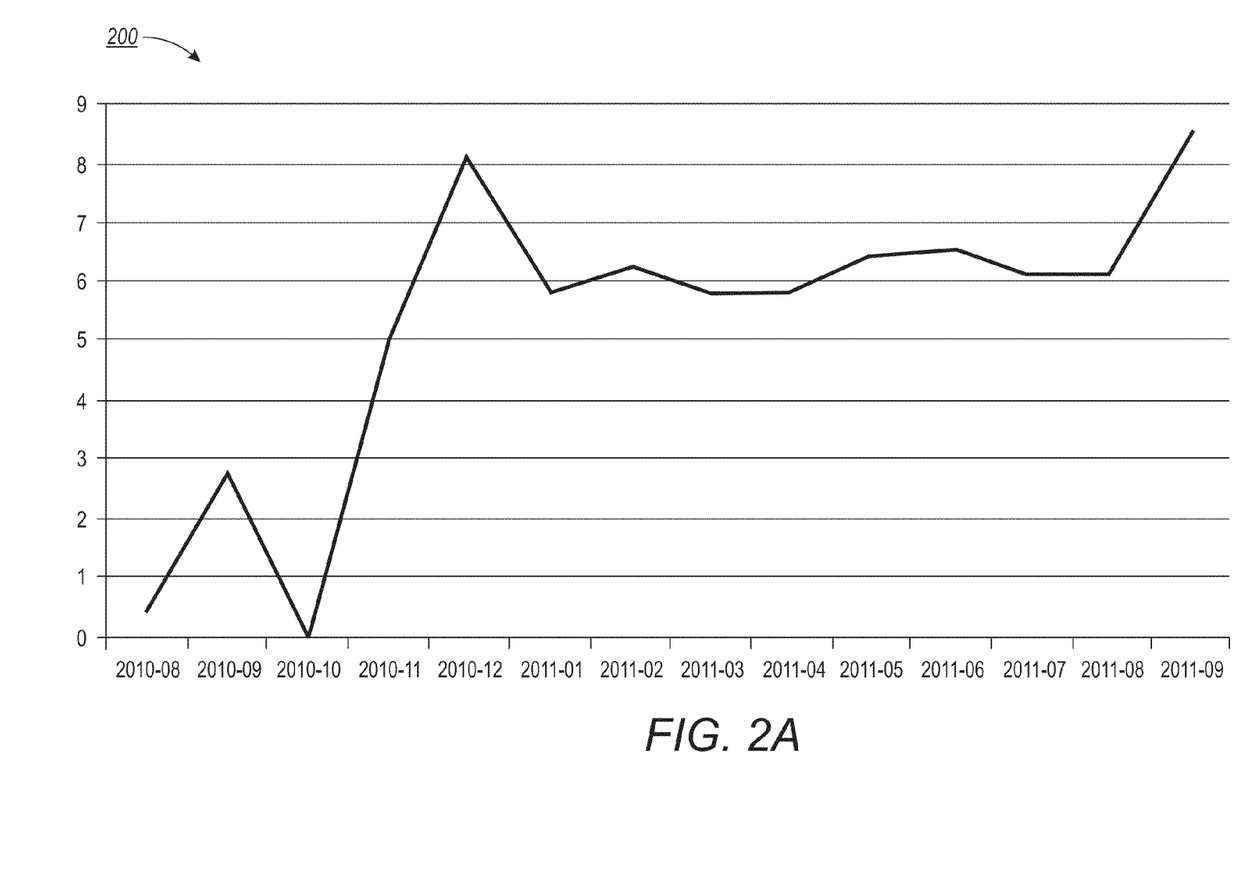
FIGS. 2a and 2b depict a first set of count regression models according to an embodiment.
Figure 2B:
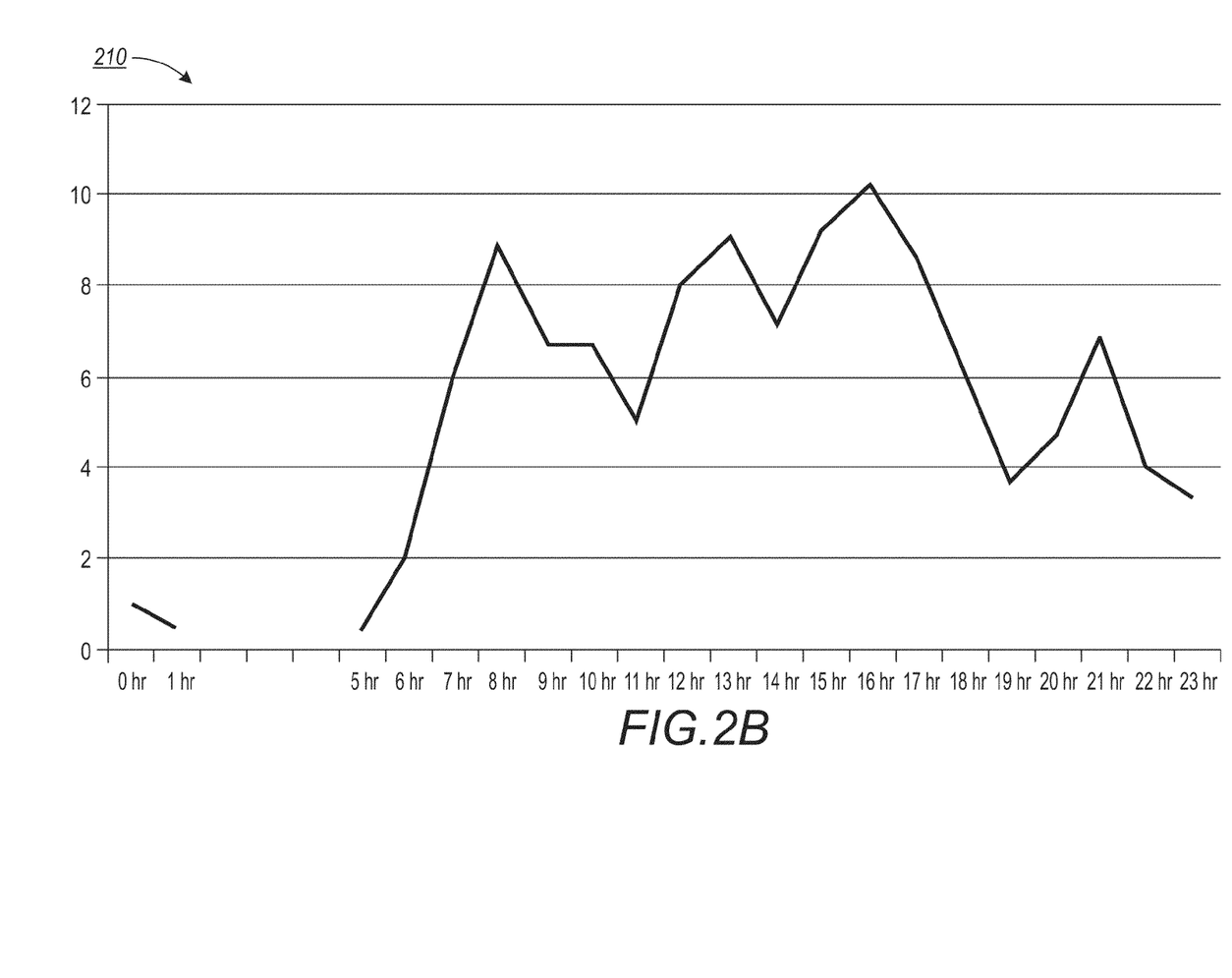

Based upon the information contained in the contingency table 100, one or more count regression models may be fitted to the data. A regression model is a model that relates a dependent variable to a function of an independent variable and one or more other parameters. A count regression model is a regression model that uses count data, which in this case is historic data of incidents and the times associated with each incident. For example, FIGS. 2a and 2b illustrate to examples of such count regression models. A model 200 may illustrate the frequency of late incident occurrences as distributed over various months of the year. Similarly, a model 210 may illustrate the frequency of late occurrences as distributed over various hours of the day. From the models, various inferences may be made about the incident data such there is a higher chance of a late incident occurring around morning and evening rush hours, and late incidents increase around the winter months. A public transportation provider may use this information to reduce or eliminate peak occurrences by altering schedules or reassigning resources.

Any suitable function may be used to determine the regression count model. For example, to determine the models 200, 210 as shown in FIGS. 2a and 2b, one or more sets of Poisson regression equations may be used. The number of incidents occurring at a particular place or across the system may be regarded as having a Poisson distribution. That is, the counts are random and obey a Poisson distribution. Further, the rate or expected number of occurrences may be modeled as functions of covariates such as hour of day and month year. Thus the number occurrences of an incident type may have the probability distribution:

$$P(X_{hm} = x_{hm}) = \frac{e^{-\lambda_{hm}} \lambda_{hm}^{x_{hm}}}{x_{hm}!}; x_{hm} \geq 0$$

where $x_{hm}$ is the count of incidents occurring at hour h and month m such that $\log(\lambda_{hm}) = \alpha_h + \beta_m$ (or equivalently, $\lambda_{hm} = e^{\alpha_h} e^{\beta_m}$). The average or expected number of occurrences $\lambda_{hm}$ may be decomposed into two separate rates, a rate for each hour of the day $e^{\alpha_h}$ and a rate for each month of the year, $e^{\beta_m}$. The model above may be fitted to the contingency data using methods known in the art: maximum likelihood estimation and Bayesian estimation. Both methods produce similar numeric results. The estimation procedure enables two effects, an hourly effect and a monthly effect to be estimated simultaneously. The hourly effect may hold regardless of the month and the monthly effect may hold regardless of the hour of the day.

Further, other effects may be estimated to give more detailed analysis. For example, there may be three effects of interest, hour of the day, day of the week and month of the year. That incident count model would be again a Poisson process:

$$P(X_{hwm} = x_{hwm}) = \frac{e^{-\lambda_{hwm}} \lambda_{hwm}^{x_{hwm}}}{x_{hwm}!}; x_{hwm} \geq 0$$

where $x_{hwm}$ is the count of incidents occurring at hour h, week day w and month m, such that $\log(\lambda_{hwm}) = \alpha_h + \gamma_w \times \beta_m$ (or equivalently, $\lambda_{hwm} = e^{\alpha_h} e^{\gamma_w} e^{\beta_m}$). The average or expected number of events $\lambda_{hwm}$ may be decomposed into three separate rates, $e^{\alpha_h}$ for the contribution of the hour h of the day, $e^{\gamma_w}$ for the rate contribution of weekday w, and $e^{\beta_m}$ rate contributed for the month m.

Other count distributions can be employed depending on the data. For example the negative binomial distribution generalizes the Poisson distribution and can at times provide a better fit to the data. Further, if incidents are relatively rare and the contingency matrix has a significant proportion of zeros, one would use a zero-inflated model which has a Poisson model combined with a term that captures the probability of observing an excessive number of zeros. The negative binomial model also can be "zero-inflated" to accommodate a significant proportion of zeros in the contingency matrix.

For example, a Poisson distribution $x_{hm} \sim \text{Poisson}(\lambda_{hm})$ may be used to interpret the data contained in the contingency table 100 in accordance with the following equation:

$$\log(\lambda_{hm}) = \alpha_h + \beta_m$$

where h=hour of day and m=month of year.

Using this set of equations, the model 200 as shown in FIG. 2a depicts alphas, and the model 210 as shown in FIG. 2b depicts betas, showing the varying contributions by time to the late incidents at the stop using the data of FIG. 1.

Depending on the capabilities of the CAD/AVL system, additional information related to the operation of the transportation system may be collected, analyzed and displayed. For example, individual factors that may contribute to a late incident may be analyzed to show how their occurrence impacts overall incidence occurrence. For example, bike rack usage may contribute to the lateness of a bus. To use a bike rack, either a passenger or the operator of the bus may lower the bike rack, secure a bike within the rack, unsecure the bike when the passenger has reached their destination, and raise the bike rack one it is empty. These steps may attribute to a late incident for an individual bus and the transportation authority managing the bus may be interested in related data.

Figure 3A:
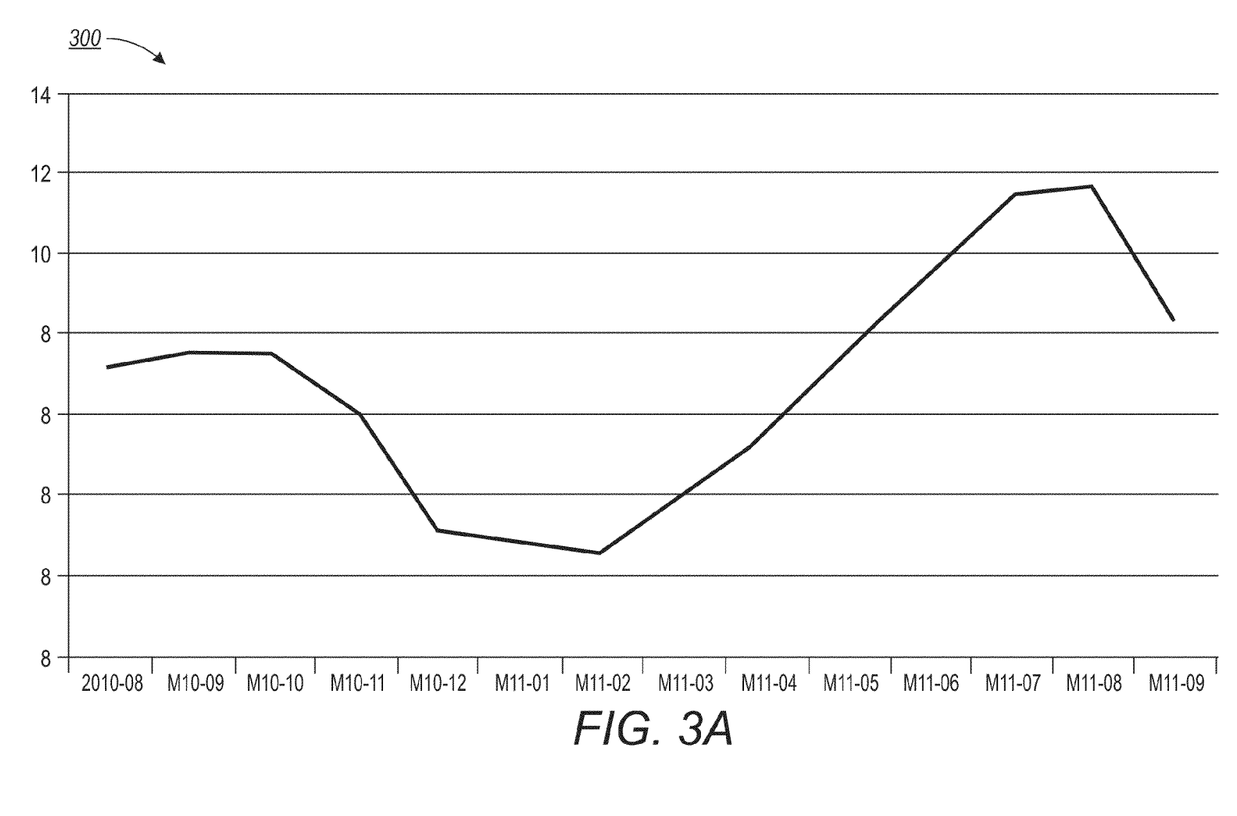
FIGS. 3a and 3b depict a second set of count regression models according to an embodiment.
Figure 3B:
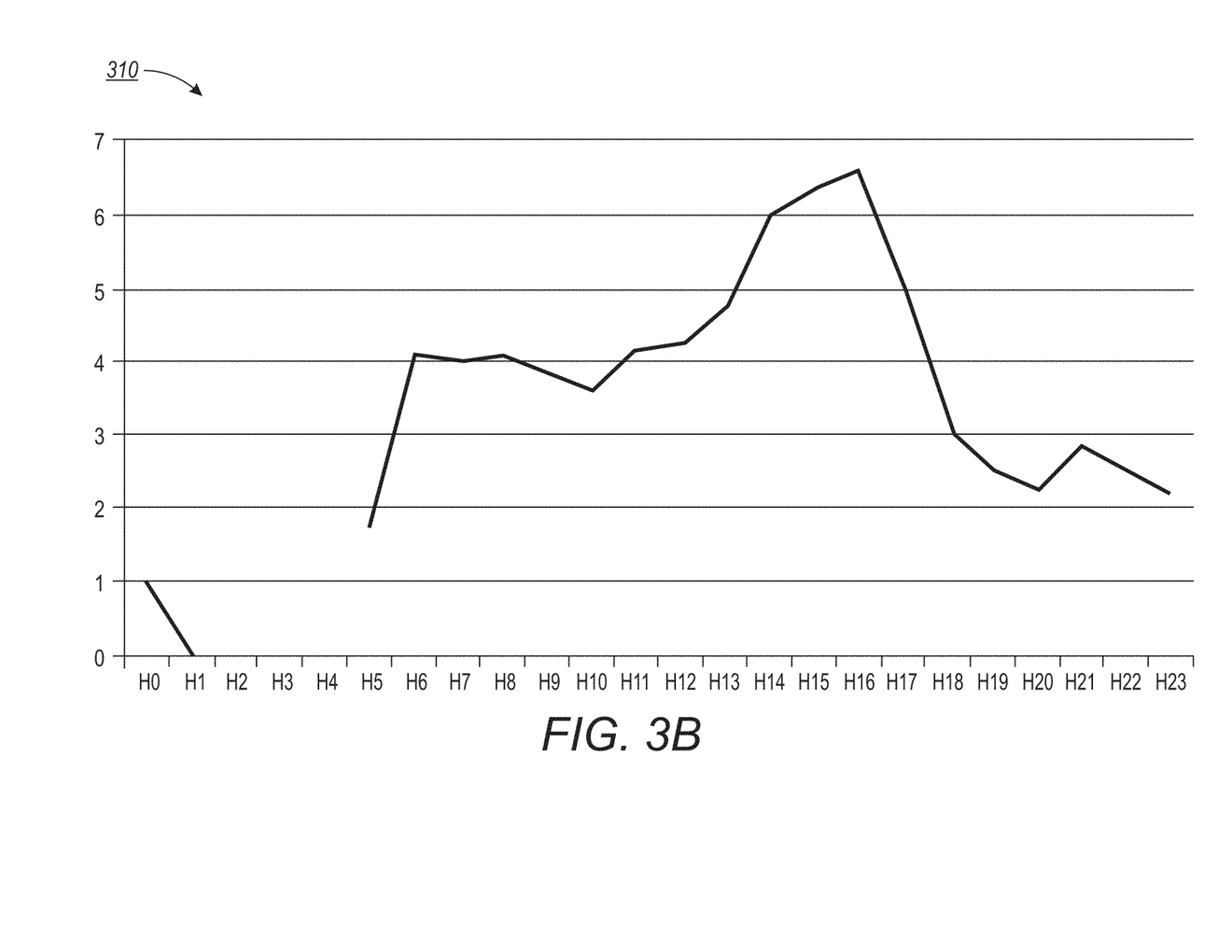

Like above, a contingency table may be constructed from CAD/AVL data related to occurrences of bike rack usage. This information may then be fitted into one or more count regression models. For example, as noted above, bike rack usage can contribute to late arrivals of a bus, as it takes time for riders to load and unload their bikes. FIG. 3a illustrates a first count regression model 300 that may show bike rack usage over a first time interval, in this case months of the year. As shown in model 300, bike rack usage drops in the winter months, and reaches a peak in the summer months. Similarly, a second count regression model 310 may show bike rack usage over a second time interval, in this case the course of a day. As shown in model 310, bike rack usage peaks in the evening hours, possibly suggesting that more bike riders ride their bikes to work in the morning, and take a bus home in the evening, making use of the available bike racks.

Based upon this information, the transportation authority managing the bus may alter the types of buses running in the evening during the summer months to include more busses with bike racks. Similarly, during the winter months, the transportation agency may reduce the number of busses running with bike racks.

Figure 4:
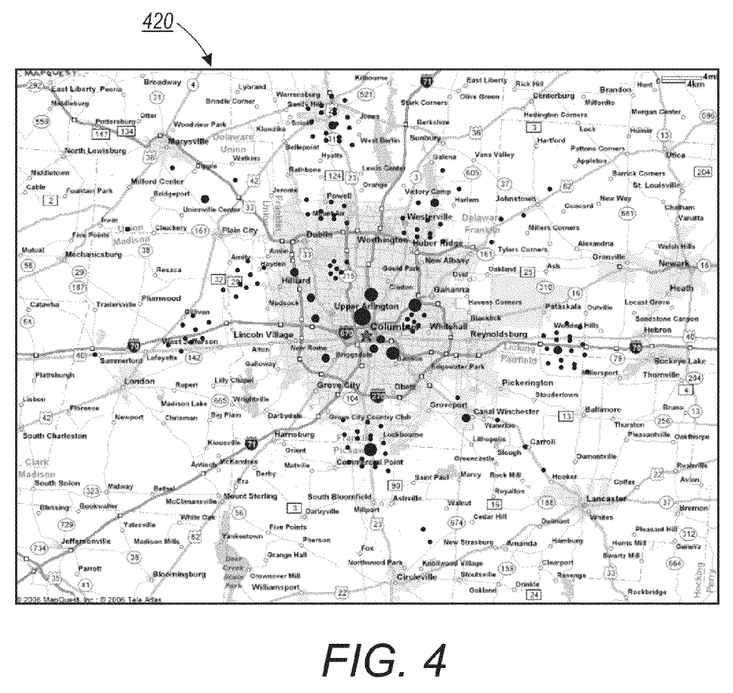
FIG. 4 depicts a spatial plot of bus bike rack usage as shown in the count regression models of FIGS. 3a and 3b, according to an embodiment.

Additionally, the system may take the information from regression models for multiple stops and illustrated the information such as on a graphical display such as overlaid data on a map. FIG. 4 illustrates a map 420 with bike rack related information overlaid on the map. As shown on the map 420, individual dots represent bus stops where bike racks are used. In this example, the larger the dot on the map 420, the more often bike racks are used at that bus stop. The transportation agency may use this information to ensure that routes that would benefit from busses with bike racks attached are properly served. Additionally, the transportation agency may use the map information to ensure that drivers on routes with high bike rack usage are educated in how to quickly use the bike racks, thereby potentially reducing late incidents resulting from timely delays to load/unload bikes from bike racks.

The map may be configured such that a user of a computing device displaying the map can obtain additional information. For example, the user may select a point on the map and obtain additional information related to that point such as bus stop name, location of bus stop, busses servicing that bus stop, schedules of busses servicing that stop, and other related information.

Figure 5A:
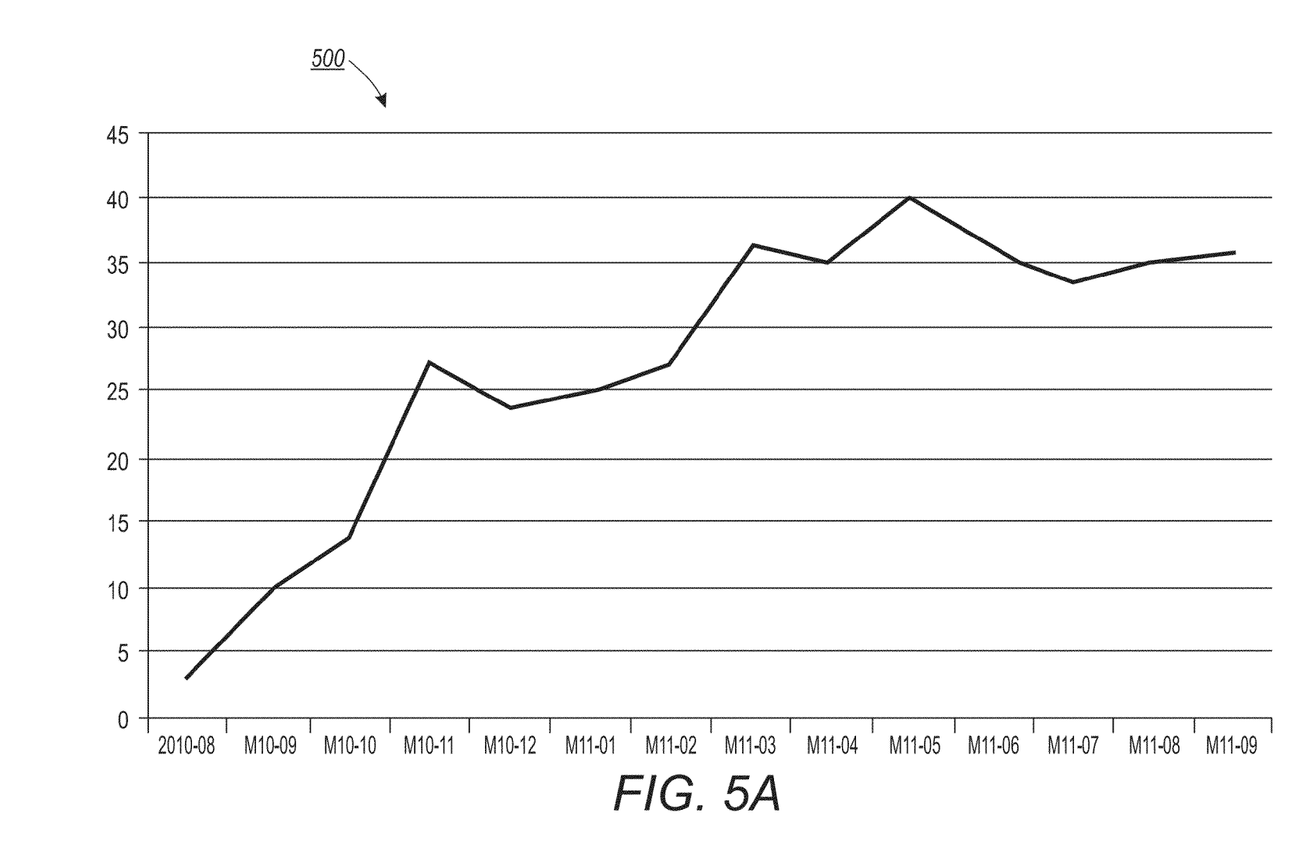
FIGS. 5a and 5b depict a third set of count regression models according to an embodiment.
Figure 5B:
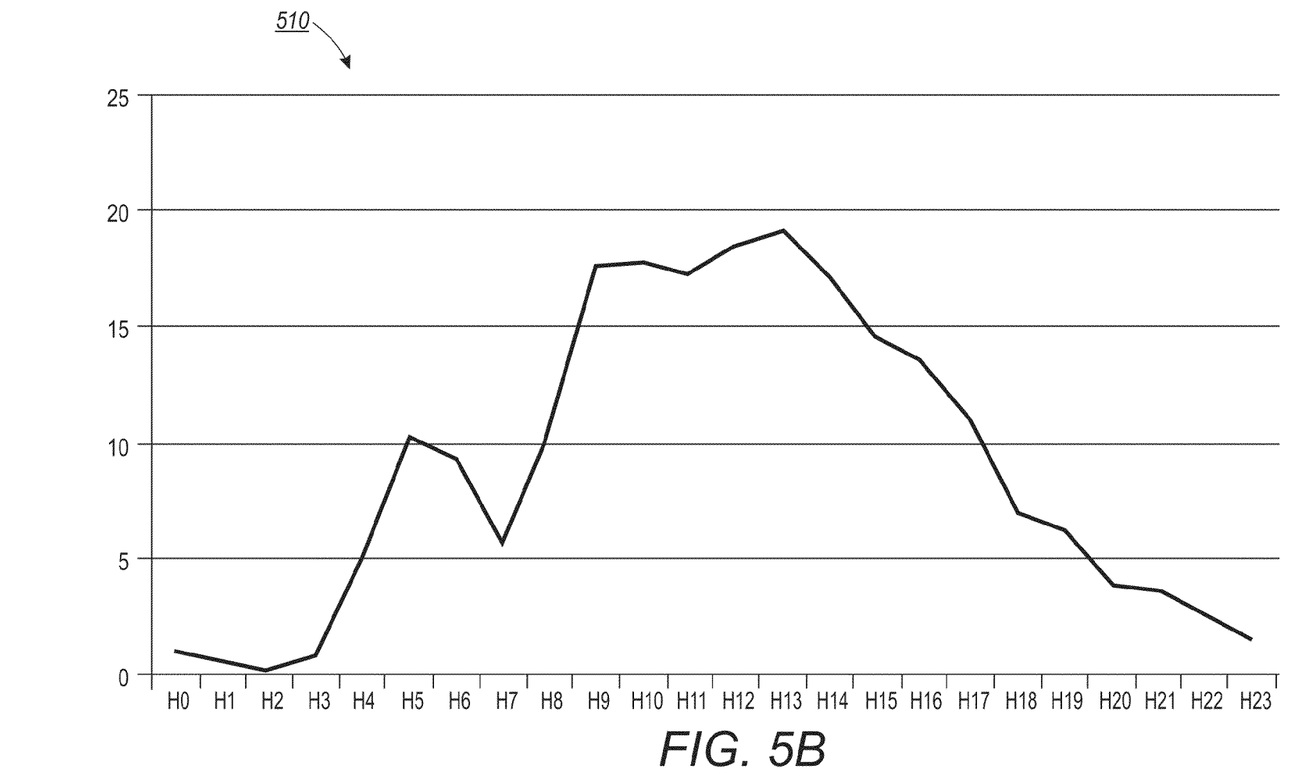

A contingency table may also be constructed from CAD/AVL data related to occurrences of wheelchair lift usage. This information may then be fitted into one or more count regression models. For example, FIG. 5a illustrates a first count regression model 500 that may show wheelchair lift usage over months of the year. As shown in model 500, wheelchair lift usage steadily increases, and reaches a peak in the spring months before leveling out. Similarly, a second count regression model 510 may show wheelchair lift usage over the course of a day. As shown in model 510, wheelchair lift usage peaks in the morning hours, and steadily decreases as the through evening and night.

Based upon this information, the transportation authority managing the bus may alter one or more operating parameters such as the schedules of buses running in the morning during the spring months to accommodate for the increase in wheelchair lift usage.

Figure 6:
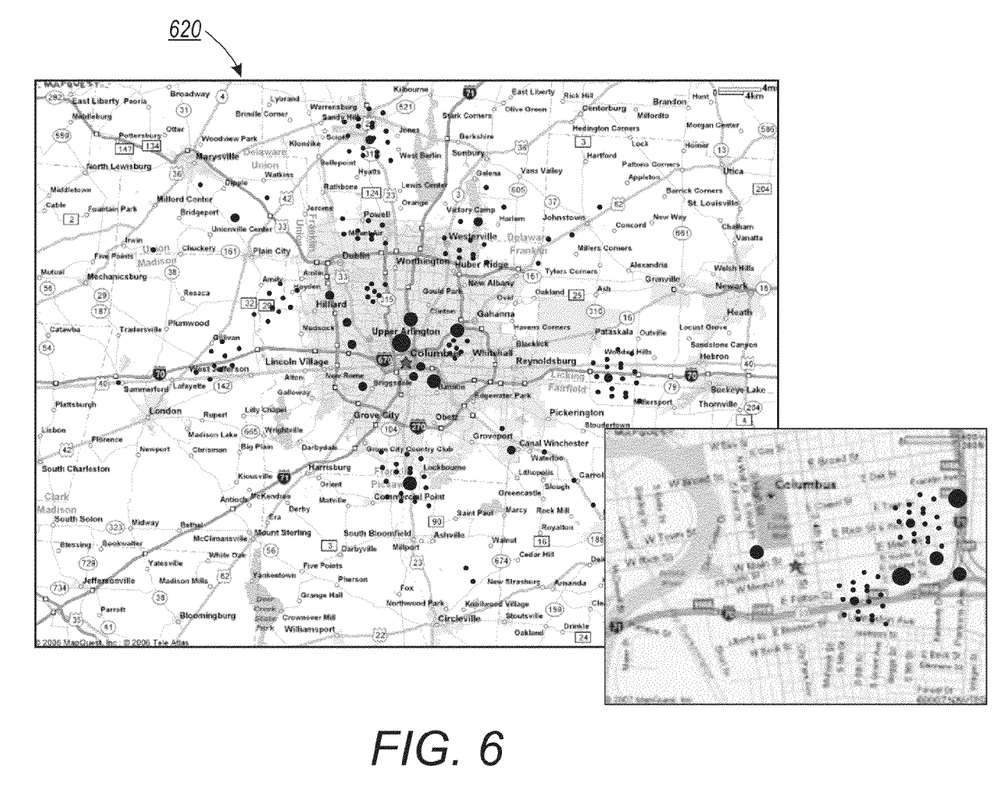
FIG. 6 depicts a spatial plot of wheelchair lift usage as shown in the count regression models of FIGS. 5a and 5b, according to an embodiment.

Additionally, the information related to wheelchair lift usage may be illustrated on a graphical display such as overlaid data on a map. FIG. 6 illustrates a map 620 with wheelchair lift usage related information if FIGS. 5a and 5b, along with corresponding geographic information about stop locations, overlaid on the map. As shown on the map 620, individual dots represent bus stops where wheelchair lifts are used. In this example, the larger the dot on the map 420, the more often wheelchair lifts are used at that bus stop. The transportation agency may use this information to ensure that routes that would benefit from busses with wheelchair lifts are properly served. Additionally, the transportation agency may use the map information to ensure that drivers on routes with high wheelchair lift usage are educated in how to quickly use the wheelchair lifts, thereby potentially reducing late incidents resulting from timely delays to load/unload passengers in wheelchairs.

It should be noted that the Poisson log linear models as shown above in FIGS. 2a, 2b, 3a, 3b, 5a and 5b are shown by way of example only. Additional modeling techniques such as maximum likelihood modeling and Bayesian model fitting may be used, thereby resulting in additional count regression models such as a zero inflated Poisson log linear model, a negative binomial log linear model, a zero inflated negative binomial log linear model, and other similar regression models. Additionally, contingency table 100 as shown in FIG. 1 is shown as a two-dimensional table by way of example only. Depending on the data set, a three-dimensional contingency table may be used.

Figure 7:
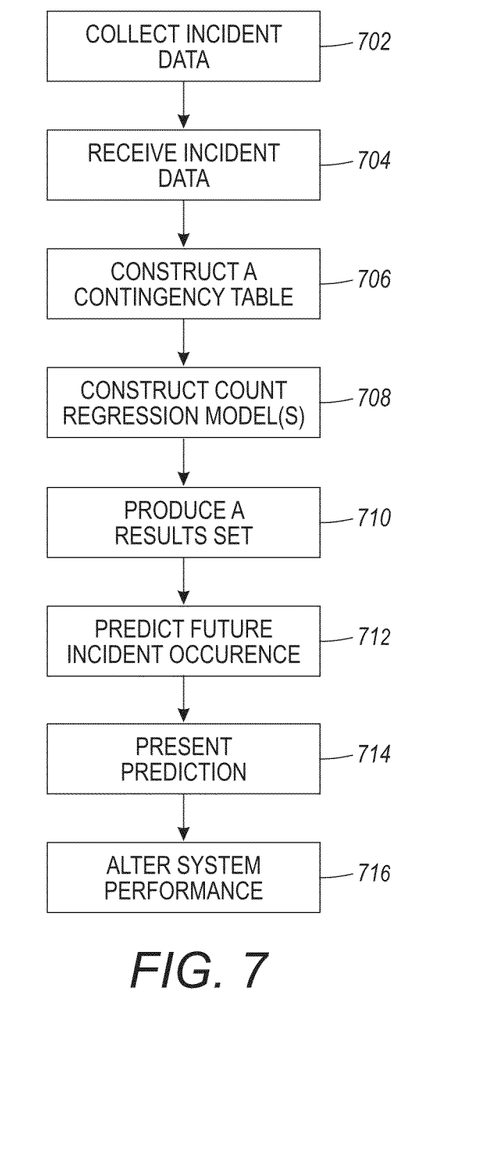
FIG. 7 depicts a sample flow diagram of a method for determining potential changes to a system based upon analysis of one or more regression models according to an embodiment.

FIG. 7 illustrates a sample flow chart for determining potential changes to a system based upon analysis of one or more regression models according to an embodiment. For example, this flow chart may be adapted for a public transportation system as described above. Various incident data such as number of times a bus is late, number of times a bike rack is used and number of times a wheelchair lift is used may be collected 702 via an information collection system such as the CAD/AVL system. The data may include a date and time stamp for later sorting and/or analysis.

Figure 8:
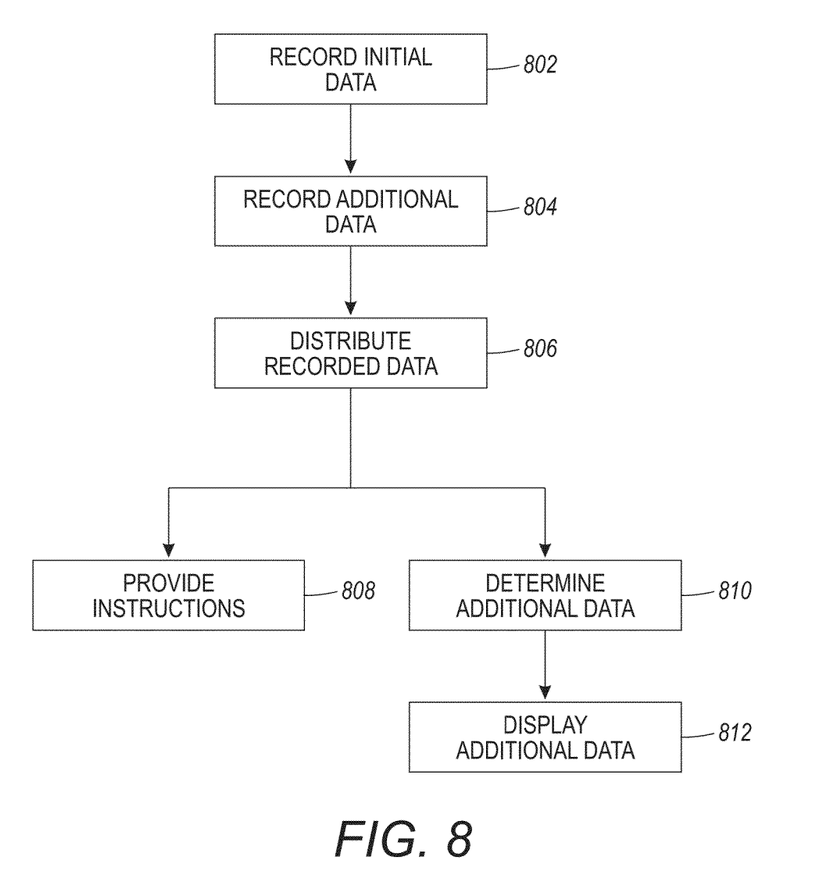
FIG. 8 depicts a sample flow chart for collecting and displaying various data related to the operation of a transportation vehicle according to an embodiment.

FIG. 8 illustrates a sample flow chart for collecting and displaying various data related to the operation of a transportation vehicle such as a bus. At least a portion of the flow chart as shown in FIG. 8 may be used for collecting 702 the incident data as shown in FIG. 7. Upon starting operation of the transportation vehicle, a set of initial data may be recorded 802. For example, if the transportation vehicle is a bus, the operator of the bus may enter their driver identification, route number, bus number, and other related information into the CAD/AVL system. The CAD/AVL system may record 802 this data, along with other data such as a timestamp and the geographic location of the bus.

During operation of the bus, the CAD/AVL system may record 804 additional data such as an arrival time at each stop, duration of time spent at each stop, departure time from each stop, travel time between each stop, average travel speed, maximum travel speed, number of times a wheelchair ramp is used, and other related information. Additionally, the operator of the vehicle may manually enter additional information into the CAD/AVL system to be recorded 804. For example, each time a bike rack is accessed the driver may record 804 this information into the CAD/AVL system.

Depending on the capabilities of the CAD/AVL system, the system may distribute 806 the data to a central server according to a set schedule. For example, depending on the network connection of the CAD/AVL system, the system may upload the data each time a new entry is recorded 802, 804. Alternatively, the information may be distributed 806 from the CAD/AVL system at the end of a route or the end of an operator's shift.

Based upon the distributed 806 data, the server or a similar processing device at the transportation agency may perform various additional functions. For example, if the data indicates a particular vehicle is running ahead of schedule, instructions may be provided 808 to the operator of that vehicle to slow down or to spend additional time at the next stop. Alternatively, based upon geographic information received from a vehicle, the server may determine that the vehicle is approaching heavy traffic or a crash, and provide 808 the operator of the vehicle instructions to take an alternate route.

Additionally, based upon the distributed 806 data, the transportation agency server may determine 810 additional data. For example, the server may determine 810 that a vehicle will be late to its next four stops. Accordingly, the server may transmit instructions to display 812 this information at an electronic sign or display at each of those four stops, indicating to any waiting passengers that the vehicle is running late.

It should be noted that one or more of the steps as shown in FIG. 8 may be incorporated into the data collection 702 as shown in FIG. 7. For example, the data collection 702 may include recording 802 the initial data, recording 804 additional data, and distributing 806 the recorded data.

Referring again to FIG. 7, the collected 702 incident data may be transferred to and received 704 at a central server associated with a transportation authority and stored in a database or other similar storage structure.

A processing device configured to run one or more modeling software applications or modules may load the collected and received data and construct at least one contingency table 706. For example, the processing device may construct a late incident contingency table similar to table 100 as shown in FIG. 1. The processing device may also construct 708 one or more count regression models such as though shown in FIGS.

2a, 2b, 3a, 3b, 5a and 5b. For example, the processing device may construct a count regression model showing a Poisson linear log regression for bike rack usage occurrence per month of the year similar to model 300 as shown in FIG. 3a.

Based upon the at least one constructed count regression model, the processing device may produce 710 a results set showing a graphical representation of the analyzed data. Based upon the results set, the processing device may predict 712 one or more future incident occurrences that may affect a particular vehicle in the transportation system, or the entire transportation system itself. For example, if the result set indicates that a bus is consistently late to a stop scheduled for 8:45 AM, the processing device may predict 712 a bus will be late to the 8:45 AM stop tomorrow morning. A schedule adjustment may be made and communicated to the driver of that bus to accommodate for the late arrival prediction. For example, the drive may be instructed to Based on the fitted model, $\lambda_{hwm} = e^{\alpha_h} e^{\gamma_w} e^{\beta_m}$, the number of incidents may be predicted for any combination of hour, week day and month. For example, the estimated model has estimates for $\alpha_h$, $\gamma_w$, and $\beta_m$ for each hour of the day, week day, and month of the year. The expected number of incidents, for example on a Tuesday in March at 2:00 PM, may be calculated by multiplying the terms together: $\lambda_{2pm,Tues,March} = e^{\alpha_{2pm}} e^{\gamma_{Tues}} e^{\beta_{March}}$. It should be noted that this is process is an improvement over simply using the historical data for that time in the past because the model, by virtue of a being a statistical model, it smoothes out extraneous noise and variation, and is more accurate.

The processing device may present the prediction to a user 714 such as by outputting the prediction to a data file, to a printed document, to a display, to an audio output, or to a messaging system such as an email or text messaging system.

Also, the processing device may create an indication to alter 716 the service such that the predicted 712 occurrence is avoided. By fitting historical incident data with the model, improvements in performance may be implemented. For example, if it is determined that wheel chair lift usage has a peak in the early morning while other ridership is relatively low, it would be advantageous to deploy para-transit vehicles in the early morning to handle wheel chair transportation demand and reduce the schedule of regular buses. To continue the above example, if the processing device predicts 712 a bus will be late to the 8:45 AM stop tomorrow morning, the bus schedule may be altered 716 and communicated to the driver of that bus to accommodate for the late arrival prediction. For example, the driver may be instructed to spend less time waiting at a particular stop to make up for the potential late arrival.

Another example is in regards to late incidents. The system may suggest that the service provider add a vehicle to a route or portion of a route to accommodate for times and/or locations when incidents are predicted to be high, such as when they typically exceed an upper threshold. Alternatively, the system may suggest that the service provider remove a vehicle from the route or portion of the route during times and/or locations when incidents are predicted to be low, such as when they typically fall below a lower threshold. Alternatively, the prediction may be presented to a user of the processing device such that the user may alter 716 the system performance to accommodate for the late bus. Depending on the situation, altering 716 the system performance may include adding one or more busses to the system, removing one or more busses from the system, changing a schedule for a particular bus, changing the driver of a particular bus, and other similar service alterations.

The process as described above in reference to FIG. 7 is shown by way of example only. Depending upon the implementation of the process, various steps may be removed from the process. Similarly, additional steps may be added to the process to increase the overall functionality and potential productivity of the process.

Figure 9:
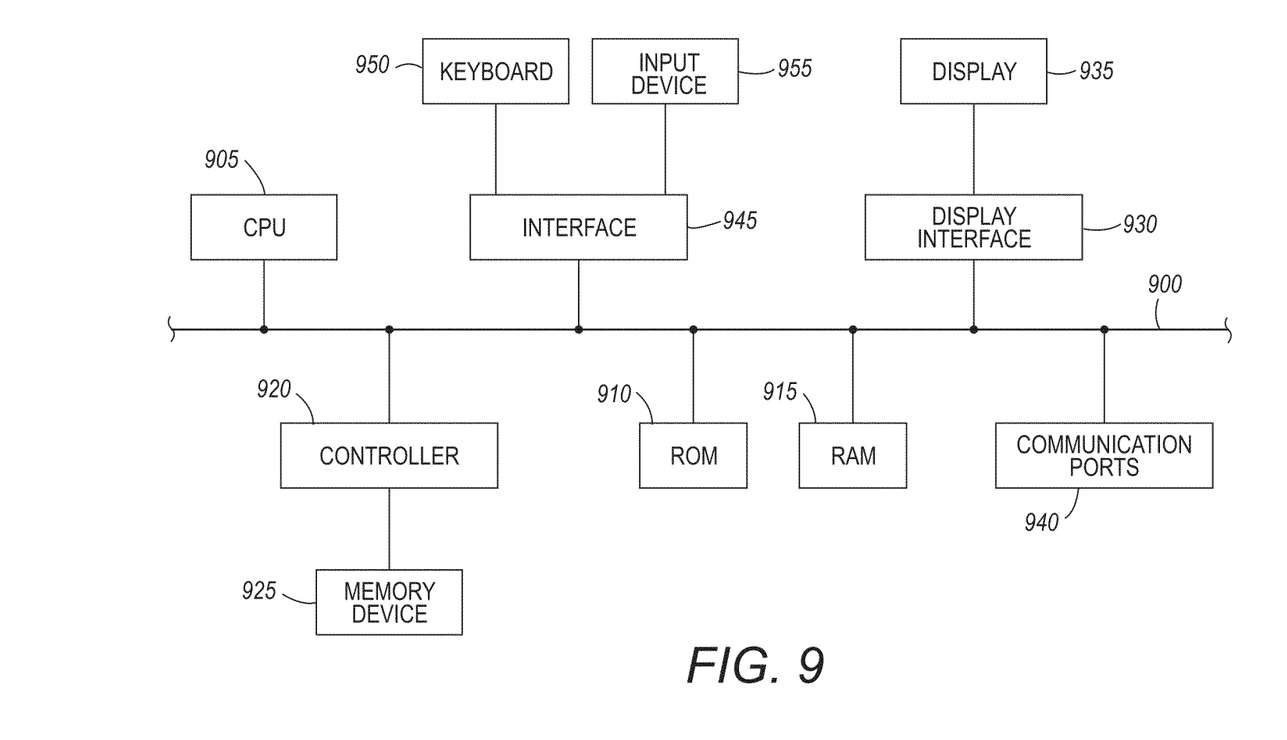
FIG. 9 depicts various embodiments of a computing device for implementing the various methods and processes described herein.

The contingency table and regression model calculations and derivations as described above, as well as changes made to the transportation system may be performed and implemented by an operator of a computing device located at an operations center (e.g., a central operations center for a public transportation provider). FIG. 9 depicts a block diagram of exemplary internal hardware that may be used to contain or implement the various computer processes and systems as discussed above. An electrical bus 900 serves as the main information highway interconnecting the other illustrated components of the hardware. CPU 905 is the central processing unit of the system, performing calculations and logic operations required to execute a program. CPU 905, alone or in conjunction with one or more of the other elements disclosed in FIG. 9, is an exemplary processing device, computing device or processor as such terms are used within this disclosure. Read only memory (ROM) 910 and random access memory (RAM) 915 constitute exemplary memory devices.

A controller 920 interfaces with one or more optional memory devices 925 to the system bus 900. These memory devices 925 may include, for example, an external or internal DVD drive, a CD ROM drive, a hard drive, flash memory, a USB drive or the like. As indicated previously, these various drives and controllers are optional devices. Additionally, the memory devices 925 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 910 and/or the RAM 915. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 930 may permit information from the bus 900 to be displayed on the display 935 in audio, visual, graphic or alphanumeric format. Communication with external devices may occur using various communication ports 940. An exemplary communication port 940 may be attached to a communications network, such as the Internet or a local area network.

The hardware may also include an interface 945 which allows for receipt of data from input devices such as a keyboard 950 or other input device 955 such as a mouse, a joystick, a touch screen, a remote control, a pointing device, a video input device and/or an audio input device.

It should be noted that a public transportation system is described above by way of example only. The processes, systems and methods as taught herein may be applied to any environment where performance based metrics and information are collected for later analysis, and provided services may be altered accordingly based upon the collected information.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A method of predicting a future occurrence of a transportation system incident, comprising:
   receiving, at a processing device, transportation incident data comprising information collected during and related to operation of at least one transportation vehicle, the information comprising at least a time stamp;
   constructing, by the processing device, at least one count regression model based upon the transportation incident data;
   producing, by the processing device, a results set based upon the at least one count regression model;
   predicting, by the processing device, at least one future occurrence of an incident based upon the results set; and
   presenting, by the processing device, the at least one predicted future occurrence.

2. The method of claim 1, further comprising determining, by the processing device, a recommendation to add or remove a vehicle to a transportation system based upon the at least one predicted future occurrence.

3. The method of claim 1, further comprising constructing, by the processing device, at least one contingency table based upon the transportation incident data.

4. The method of claim 1, wherein the at least one count regression model comprises at least one of a Poisson log linear model, a zero inflated Poisson log linear model, a negative binomial log linear model, and a zero inflated negative binomial log linear model.

5. The method of claim 1, further comprising displaying, at a display device operably connected to the processing device, the results set in a graphical user interface.

6. The method of claim 5, wherein the presenting comprises:
   merging the results set with a map; and
   showing the results set are with the transportation incident data overlaid on a the map based on the locations corresponding to incidents represented by the data.

7. The method of claim 6, further comprising altering the information displayed on the map in response to a user selection to view more information.

8. A device for predicting a future occurrence of a transportation system incident, the device comprising:
   a processor; and
   a computer readable medium operably connected to the processor, the computer readable medium containing a set of instructions configured to instruct the processor to perform the following:
   receive transportation incident data comprising information collected during and related to operation of at least one transportation vehicle, the information comprising at least a time stamp,
   construct at least one count regression model based upon the transportation incident data,
   produce a results set based upon the at least one count regression model,
   predict at least one future occurrence of an incident based upon the results set, and
   present the at least one predicted future occurrence.

9. The device of claim 8, wherein the set of instructions is further configured to instruct the processor to determine a recommendation to add or remove a vehicle to a transportation system based upon the at least one predicted future occurrence.

10. The device of claim 8, wherein the set of instructions is further configured to instruct the processor to construct at least one contingency table based upon the transportation incident data.

11. The device of claim 8, wherein the at least one count regression model comprises at least one of a Poisson log linear model, a zero inflated Poisson log linear model, a negative binomial log linear model, and a zero inflated negative binomial log linear model.

12. The device of claim 8, wherein the set of instructions is further configured to instruct the processor to display, at a display device operably connected to the processing device, the results set in a graphical user interface.

13. The device of claim 12, wherein the set of instructions configured to instruct the processor to display the results is further configured to instruct the processor to:
   merge the results set with a map; and
   show the results set are with the transportation incident data overlaid on a the map based on the locations corresponding to incidents represented by the data.

14. The device of claim 13, wherein the set of instructions is further configured to instruct the processor to alter the information displayed on the map in response to a user selection to view more information.

15. A method of predicting a future occurrence of a transportation system incident for a transportation vehicle, comprising:
   receiving, at a processing device, transportation incident data comprising information collected during and related to operation of the transportation vehicle, the information comprising at least a time stamp;
   constructing, by the processing device, at least one contingency table based upon the transportation incident data;
   constructing, by the processing device, at least one count regression model based upon the at least one contingency table;
   producing, by the processing device, a results set based upon the at least one count regression model;
   predicting, by the processing device, at least one future occurrence of an incident likely to effect the transportation vehicle based upon the results set;
   presenting, by the processing device, the at least one predicted future occurrence likely to effect the transportation vehicle; and
   altering at least a portion of the transportation system based upon the at least one predicted future occurrence to compensate for the at least one predicted future occurrence likely to effect the transportation vehicle.

16. The method of claim 15, wherein altering at least a portion of the transportation system comprises determining, by the processing device, a recommendation to add or remove a vehicle to the transportation system.

17. The method of claim 15, wherein the at least one count regression model comprises at least one of a Poisson log linear model, a zero inflated Poisson log linear model, a negative binomial log linear model, and a zero inflated negative binomial log linear model.

18. The method of claim 15, further comprising displaying, at a display device operably connected to the processing device, the results set in a graphical user interface.

19. The method of claim 18, wherein the presenting comprises:
   merging the results set with a map; and
   showing the results set are with the transportation incident data overlaid on a the map based on the locations corresponding to incidents represented by the data.

20. The method of claim 19, further comprising altering the information displayed on the map in response to a user selection to view more information.

\* \* \* \* \*